United States Patent [19]

Suzuki

[11] Patent Number: 5,093,793
[45] Date of Patent: Mar. 3, 1992

[54] METHOD OF TRANSFERRING SIGNALS WITHIN ELECTRONIC CONTROL SYSTEM FOR INTERNAL COMBUSTION ENGINES

[75] Inventor: Yoshio Suzuki, Wakoh, Japan

[73] Assignee: Honda Giken Kogyo K.K., Tokyo, Japan

[21] Appl. No.: 859,806

[22] Filed: May 5, 1986

[30] Foreign Application Priority Data

May 7, 1985 [JP] Japan .............................. 60-095616

[51] Int. Cl.$^5$ ........................................... G06F 15/20
[52] U.S. Cl. ................... 364/431.03; 364/131
[58] Field of Search ............... 364/431.03, 431.11, 364/431.12, 131, 133, 900; 123/480, 416, 417

[56] References Cited

U.S. PATENT DOCUMENTS

| | | | |
|---|---|---|---|
| 4,530,332 | 7/1985 | Harvey et al. | 123/480 |
| 4,532,594 | 7/1985 | Hosaka et al. | 364/431.11 |
| 4,556,943 | 12/1985 | Pauwels et al. | 364/431.12 |
| 4,730,256 | 3/1988 | Niimi et al. | 364/431.12 |

FOREIGN PATENT DOCUMENTS

| | | | |
|---|---|---|---|
| 0130108 | 8/1982 | Japan | 364/431.03 |
| 0023203 | 1/1986 | Japan | 364/431.03 |
| 8203930 | 11/1982 | PCT Int'l Appl. | 364/131 |

OTHER PUBLICATIONS

Rooney et al.: Microprocessors and Microcomputers, MacMillan Publishing Company, 1984.

Primary Examiner—Parshotam S. Lall
Assistant Examiner—Ellis B. Ramirez
Attorney, Agent, or Firm—Arthur L. Lessler

[57] ABSTRACT

A method of transferring at least one signal between a first central processing unit provided in an electronic control system of an internal combustion engine for controlling fuel supply to the engine and a second central processing unit provided in the control system for controlling ignition of a mixture supplied to the engine. At least one signal transfer line is connected between the first and the second central processing units. One of the central processing units produces a digital signal representing a detected value of at least one engine operating parameter and transfers same to the other central processing unit through the signal transfer line in a start-stop serial manner.

2 Claims, 5 Drawing Sheets

METHOD OF TRANSFERRING SIGNALS WITHIN ELECTRONIC CONTROL SYSTEM FOR INTERNAL COMBUSTION ENGINES

BACKGROUND OF THE INVENTION

This invention relates to a method of transferring signals within an electronic control system for internal combustion engines and, more particularly, to a method of transferring signals between central processing units, one for controlling the amount of fuel injection and another for controlling the ignition timing.

A control system for electronically controlling such items as the amount of fuel injection and ignition timing of an internal combustion engine is already known, e.g. from Japanese Provisional Patent Publication (Kokai) No. 53-76231, wherein the electronic control system is equipped with a single central processing unit (hereinafter referred to as a "CPU") supplied with input signals indicative of various engine operating parameters such as engine coolant temperature and absolute pressure in the engine intake pipe, a crank angle signal generated whenever the engine crankshaft rotates through a predetermined angular increment, and a reference position signal, two pulses of which are generated per revolution of the crankshaft. On the basis of these input signals, the single CPU executes two separate sets of computations, one related to control of fuel ignition quantity and the other related to control of ignition timing.

In recent years efforts have been made to meet the demand for improved drivability. This has resulted in more complex operational programs for each of quantities that are to be controlled, such as fuel injection quantity and quantity related to fuel injection timing, and, hence, in a heavier processing load upon the CPU.

Consequently, when it is attempted to have a single CPU execute the processing needed to control a plurality of quantities such as fuel injection quantity and fuel injection timing, it is no longer possible to deal with an increase in processing load associated with each quantity. In particular, the demand for engine control of greater precision cannot be met by a single CPU at high engine rotation, where the time available for processing is less than that which can be used when the engine is rotating at low speed. Though this demand can in fact be satisfied if use is made of a CPU having a very high processing capability, such as a 32- or 64-bit CPU, this expedient is impractical because of the high cost involved.

On the other hand, if a plurality of CPU's are employed in order to simultaneously execute the processing needed to control a plurality of quantities such as fuel injection quantity and quantity related to fuel injection timing, each CPU has to be provided with one set of engine operating parameter sensors, an input circuit, etc. for inputting engine parameter values necessary for the control by the CPU. As a result, as many sets of such sensors, as many input circuits, etc. as the number of CPU's are required, which results in an electronic control system having a very complicated and bulky construction, making it difficult to perform assembling and maintenance.

However, if, for those engine operating parameters whose values are required to be used by two or more CPU's, only one set of sensors, an input circuit, etc. are provided to detect and supply the parameter values to one of the CPU's and if this CPU is made capable of transferring the parameter values to the other CPU or CPU's, there will be no need of providing as many sets of sensors, as many input circuits, etc. as the number of CPU's for those engine operating parameters. But a problem arises with transfer of data such as engine operating parameter values between the CPU's that if data consisting of a plurality of bits are to be transferred at one time upon a timing signal, i.e., if a parallel synchronous data transfer method is applied, as many signal lines as the number of bits constituting the data frame will be required, which in turn requires use of as many pairs of terminals of the CPU's which are limited in number. Also, the above method essentially requires the two CPU's to be operated synchronously with each other to transfer data from one CPU to the other, thus requiring complicated control programming.

SUMMARY OF THE INVENTION

It is therefore the object of the invention to provide a method of transferring signals within an electronic control system for internal combustion engines, which enables precise and complicated control of a plurality of items such as fuel injection quantity and ignition timing, and also enables data transfer between CPU's without incurring complication of the system construction and other inconveniences as well as of the control programming, to thereby make the best of a limited number of CPU terminals.

According to the invention, the above object is attained through a method of transferring at least one signal between a first central processing unit provided in an electronic control system for controlling fuel supply to an internal combustion engine and a second central processing unit provided in the electronic control system for controlling ignition of a mixture supplied to the engine, wherein a value of at least one operating parameter of the engine is detected, and the detected value of the at least one operating parameter is used both for controlling the fuel supply to the engine and for controlling the ignition of the mixture supplied to the engine.

The method is characterized by comprising the following steps: connecting at least one signal transfer line between the first and second central processing units; causing one of the first and second central processing units to produce a digital signal representing the detected value of the at least one operating parameter; and causing the one of the first and second central processing units to transfer the digital signal to the other central processing unit through the at least one signal transfer line in a start-stop serial manner.

Preferably, data consisting of a predetermined number of bits is produced as the digital signal in the one of the central processing units in the one central processing unit; serializer means is provided in the one central processing unit and transforms the data into a sequence of pulses, of which each pulse corresponds to respective one of the bits, and also transfers the pulses one by one to the other central processing unit through the signal transfer line; and deserializer means is provided in the other central processing unit and transforms the sequence of pulses transferred thereto back into data consisting of the predetermined number of bits.

More preferably, the serializer means is operated in synchronism with a first clock signal, and the deserializer means is operated in synchronism with a second clock signal, which is asynchronous with the first clock signal but has the same repetition pulse period as the latter.

The above and other objects, features and advantages of the invention will be more apparent from the ensuing detailed description taken in conjunction with the accompanying drawings.

DETAILED DESCRIPTION

The method of the invention will now be described in detail with reference to the drawings.

Figure 1:
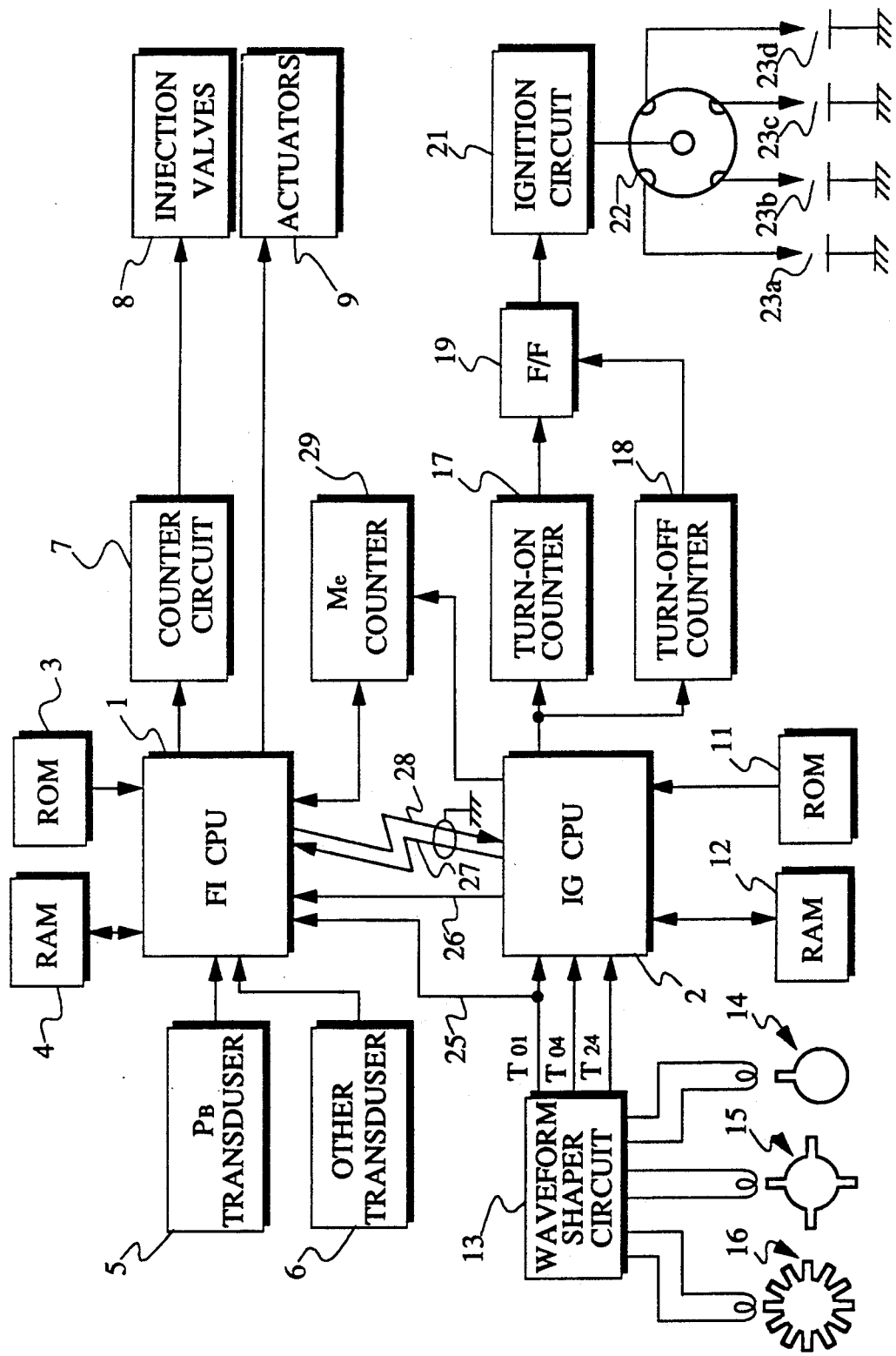
FIG. 1 is a block diagram illustrating an electronic control system for an internal combustion engine to which the method of the present invention is applied.

Referring to FIG. 1, there is illustrated the whole arrangement of an electronic control system (hereinafter called "ECU") for an internal combustion engine according to the present invention. Built in the ECU are two CPU's, namely a first CPU 1 dedicated to controlling the supply of fuel to an internal combustion engine and a second CPU 2 dedicated to controlling the timing at which a mixture formed by the supplied fuel is ignited inside the engine. Connected to the first CPU 1 are a read only memory (hereinafter called "ROM") 3 and a non-volatile random access memory (hereinafter called "RAM") 4 also serving as a backup RAM; the former stores various operational programs to be executed in the first CPU 1 and various tables to be used in calculating fuel injection quantity, i.e., valve opening period of fuel injection valves 8, and the latter temporarily stores the results of calculations performed by the first CPU 1.

Connected to the input side of the first CPU 1 are a PBA transducer 5 for sensing a value of absolute pressure PBA prevailing in the intake pipe (not shown) of the internal combustion engine and for converting this value into a digital value delivered to the first CPU 1, and a number of other transducers, indicated in FIG. 1 by a single block 6, for sensing the values of such engine operating parameters as intake air temperature TA, engine coolant temperature TW, throttle valve opening, and exhaust gas $O_2$ concentration, and for converting these values into digital values delivered to the first CPU 1. Connected to the output side of the first CPU 1 is a counter circuit 7 for counting, based on fuel ignition time data described below, the periods of time fuel injection valves 8 are to be opened. The counter circuit 7 has output lines connected to the respective fuel injection valves 8. Also driving signal lines for an EGR valve, not shown, a solenoid valve for idle controlling, not shown, etc. are connected to respective actuators 9, indicated by one block in FIG. 1. It should be noted that the fuel injection valves 8 are each provided for each cylinder of the engine. Accordingly, the counter circuit 7 is equipped with as many counters as the number of the engine cylinders.

The second CPU 2 is equipped with a ROM 11 and a RAM 12, whose functions are similar, respectively, to those of ROM 3 and RAM 4 in the first CPU 1. Connected to the input side of the second CPU 2 is a waveform shaper circuit 13, the input side of which is connected to various sensors. These sensors include a cylinder discriminating (CYL) sensor 14 which, at a predetermined crank angle position of a specific cylinder of the engine, outputs a single pulse of a cylinder discriminating signal T01, a top dead center (TDC) sensor 15 which, at a predetermined crank angle position before top dead center (BTDC) of each cylinder, outputs a reference crank angle signal T04 whenever the engine crankshaft rotates through 180°, and a crank angle sensor 16 for outputting a single pulse of a crank angle signal T24 whenever the crank shaft rotates through 30°.

Connected to output terminals of the second CPU 2 are a turn-on counter 17 and a turn-off counter 18 in paralell connection. The outputs from both of these counters 17, 18 are connected to a flip-flop circuit 19, whose output is applied to an ignition circuit 21. The output of the latter is connected to a distributor 22. The distributor 22 is connected with spark plugs 23a through 23d, each provided in respective cylinder. Arranged in the ignition circuit 21 is a well-known ignition coil, not shown, comprising a primary coil and a secondary coil. The turn-on counter 17 and the turn-off counter 18 are both down counters. As will be described in detail below, conduction timing data calculated by the second CPU 2 are set in the turn-on counter 17, which is provided with clock pulses for counting down these data in a range of crank angle positions within which conduction of the primary coil is to start (which range shall hereafter be referred to simply as a "conduction stage"), with the downcount starting from the beginning of the particular stage. This is to regulate the conduction commencing timing of the primary coil of ignition circuit 21.

Likewise, ignition timing data calculated by the second CPU 2 are set in the turn-off counter 18, which is provided with clock pulses for counting down these data in a predetermined "ignition stage", hereinafter referred to, from the beginning of this stage. This is to decide the timing at which conduction of the primary coil is to be terminated, whereby the secondary coil is made to generate a high voltage pulse for firing one of the spark plugs 22. Thus, the turn-on counter 17 and turn-off counter 18 in combination decide the turn-on timing and turn-off timing of the primary coil in ignition cirucit 21.

Various signal lines interconnect the first and second CPU's 1 and 2. These include a transfer line 25 connected between the output side of the waveform shaper circuit 13 and the input side of the first CPU 1 for transfer of the cylinder discriminating (CYL) signal T01, a transfer line 26 connected between the output side of the first CPU 1 and the input side of the second CPU 2 for providing a trigger signal q from the former to the latter, in response to which the CPU 1 starts performing calculations. Also, transfer lines 27 and 28 are connected between the first CPU 1 and the second CPU 2, the line 28 being for transferring such data as engine operating parameters as well as a transfer instruction signal from the first CPU 1 to the second CPU 2, and the line 27 being for sending an acknowledgement signal from the second CPU 2 to the first CPU 1 confirming that the transfer instruction has been received. A serializer circuit is provided in the CPU 1 at the output end of the transfer line 28 and another in the CPU 2 at the output end of the transfer line 27. Also, a deserializer circuit is provided in the CPU 1 at the input end of the transfer line 27 and another in the CPU 2 at the input end of the transfer line 28.

Connected to the second CPU 2 is an Me counter 29 via a line 30 to be supplied with a start trigger signal from the CPU 2 therethrough. The output of the Me counter 29 is connected to the first CPU 1. The start trigger signal is generated each time the second CPU 2 detects a particular crank angle position, e.g. 90 degrees BTDC. When supplied with each start trigger signal, the Me counter 29 has its counted value stored into a register, not shown, and at the same time the counted value is reset to zero, immediately followed by restarting the counting of clock pulses applied thereto. Thus, the counted value stored in the register represents the number of clock pulses generated between the immediately preceding start trigger signal and the present one, in other words, the time interval of generation of start trigger signals. The registered counted value is read into the first CPU 1 to be used in calculation of a parameter value Me, which is a value proportionate to the reciprocal of the engine rotational speed Ne. The value Me is used as one of the parameters in the calculation of fuel injection quantity as information indicative of the engine rotational speed Ne.

Next, referring to FIG. 2, the constructions and operations of the serializer circuit and the deserializer circuit provided at the ends of the transfer line 28 will now be explained. Since the constructions and operations of corresponding circuits at the ends of the transfer line 27 are identical with those provided at the line 28, the explanation thereof is omitted.

Figure 2:
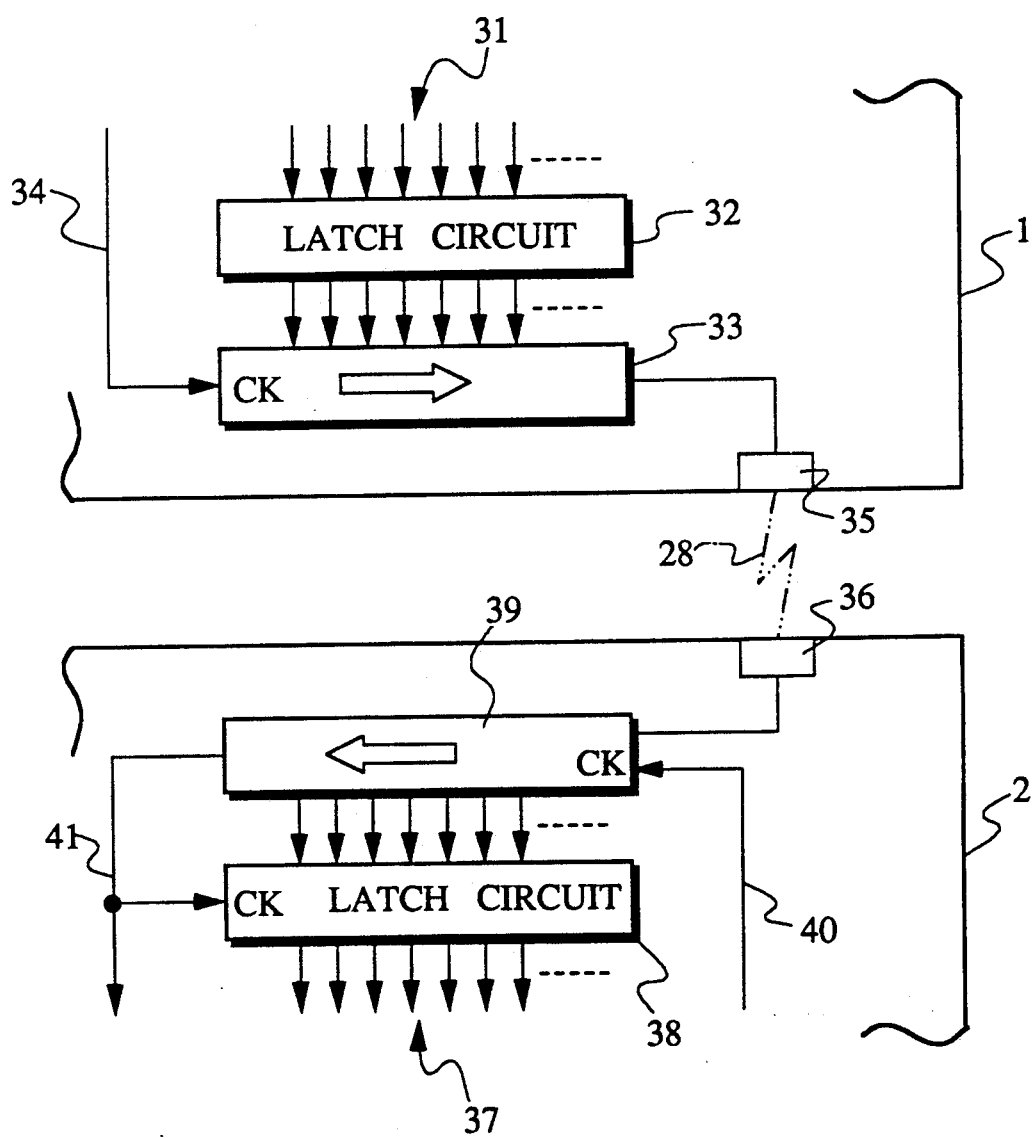
FIG. 2 is a block diagram illustrating a data transfer circuit comprising latch circuits and shift registers, and adapted to transfer data between first and second central processing units in FIG. 1.
Figure 7:
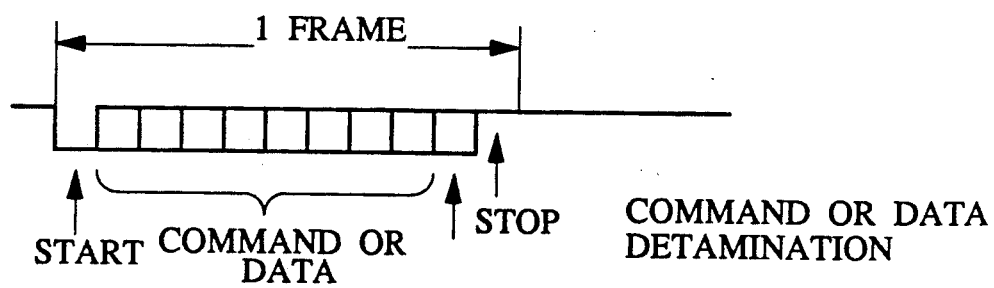
FIG. 7 is a block diagram illustrating the arrangement of one frame of data to be transferred.

In FIG. 2 reference numeral 31 designates the serializer circuit, which is composed of a latch circuit 32 adapted to latch eleven bits as one frame consisting of eight bits representing command or engine operating parameter data, one bit for determining whether they are command or data bits, and two bits for starting and stopping the transfer, respectively, (hereinafter called "start bit" and "stop bit", respectively) (FIG. 7), and a shift register 33 adapted to receive the eleven bit data in a parallel manner, i.e. at one time from the latch circuit 32 and transfer the input data in a serial manner by one bit each time a clock pulse is applied thereto through a transfer line 34. An output terminal of the shift register 33 is connected to an input terminal of a shift register 39 in the second CPU 2, via an output port 35, the transfer line 28 and an input port 36. This shift register 39 cooperates with a latch circuit 38 to constitute the deserializer circuit 37, and is disposed to store the eleven bit data inputted thereto in a manner reverse to the operation of the serializer circuit 31.

In FIG. 2, reference numeral 40 designates a transfer line for inputting clock pulses to the shift register 39. Inputting of clock pulses to the register 39 through the input transfer line 40 is effected in asynchronism with inputting of clock pulses to the register 33 through the transfer line 34 but the two kinds of clock pulses have the same frequency.

When the transfer of eleven bit data has been finished, a signal corresponding to the stop bit of the data thus transferred, hereinafter referred to, is supplied from the register 39 through an output transfer line 41 to a clock input terminal of the latch circuit 38 to inform that a transfer of one frame of data has been completed. In the case of transferring two frame data continuously as described later, a signal corresponding to the stop bit of a first frame of data is supplied from the shift register 39 to the latch circuit 38 to inform that a transfer of the first frame of data has been completed, and a signal corresponding to the stop bit of a second frame of data to inform that a transfer of the second frame of data has been completed, respectively.

Now, the operation of the electronic control system constructed as above will now be explained with reference to FIGS. 3 through 7.

Figure 3:
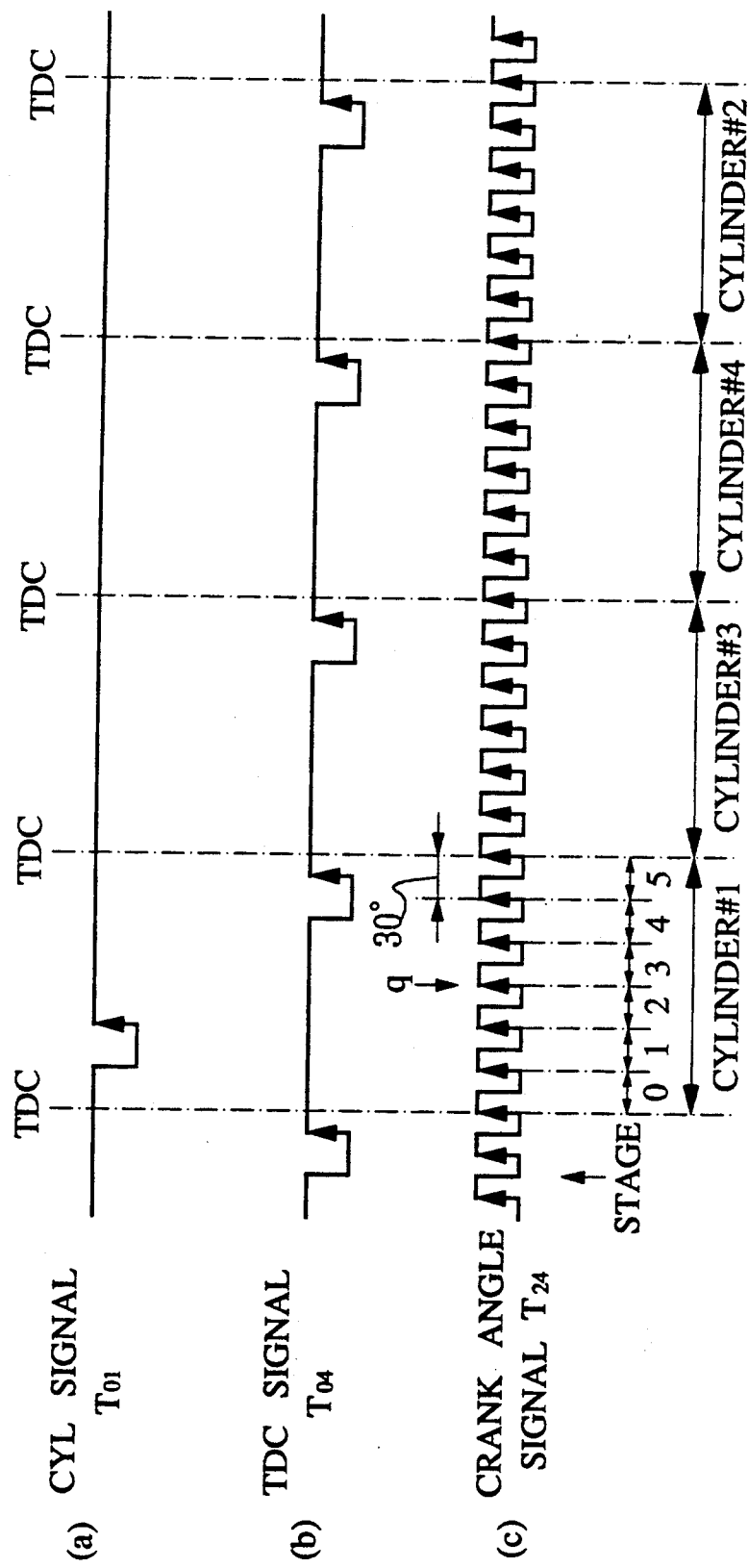
FIG. 3 is a timing chart illustrating the timing of generation of pulses such as of TDC signal and crank angle position signal.
Figure 4:
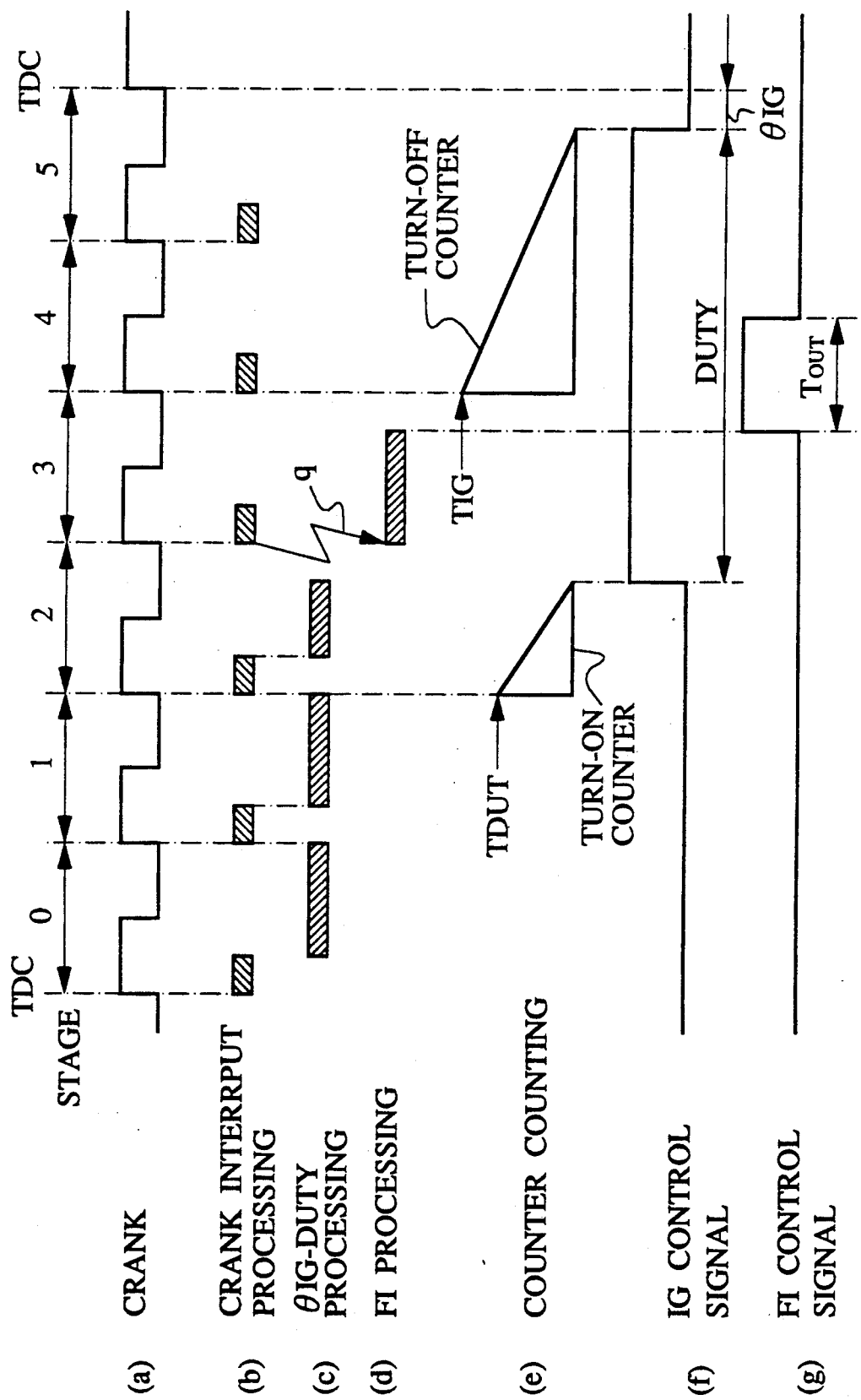
FIG. 4 is a timing chart illustrating the timing of commencement of conduction of the ignition coil, termination of same, etc.

The ignition timing control is conducted by the second CPU 2, to which the CYL signal T01, the TDC signal T04, and the crank angle signal T24 are supplied from the respective sensors 14 through 16 after their waveforms have been shaped by the waveform shaper circuit 13 [at (a)-(c) in FIG. 3]. Of these signals, the CYL signal T01 is also supplied to the first CPU 1 through the transfer line 25 as a signal for determination as to which of the engine cylinders fuel injection is to be effected into. The stages shown in FIGS. 3 and 4 refer to the time interval or spacing between the leading edge of each pulse of the crank angle signal T25 and the leading edge of the next pulse. These stages are numbered consecutively from 0 to 5 starting from the first stage.

The second CPU 2 executes two programs for controlling ignition timing. One is a crank interrupt processing program [(b) of FIG. 4] executed whenever a pulse in the crank angle signal T24 is generated, and the other is a $\theta$IG-DUTY processing program [(c) of FIG. 4] executed following the end of the crank interrupt processing program executed in stage 0. When a pulse in the crank angle signal T24 is inputted to the second CPU 2 during execution of the $\theta$IG-DUTY processing, execution of crank interrupt processing takes precedence.

In the crank interrupt processing, it is determined whether the present stage is a conduction stage at which the turn-on counter 17 is to start counting based on the TDC signal T04 and crank angle signal T24 (stage 2 in FIG. 4), a predetermined stage at which to start the turn-off counter 18 is to start counting based on the above signals (stage 4 in FIG. 4), a predetermined stage at which the first CPU 1 is to start executing a fuel injection quantity control operation (FI operation), described later (stage 3 in FIG. 4), etc. In particular, the second CPU 2 determines whether or not the present stage is the stage 3, and when it is so determined, the second CPU 2 supplies the first CPU 1 with a start trigger signal through the trigger signal line 26, whereby the FI operation is started by the first CPU 1. The second CPU 2 is also adapted to execute another crank interrupted handling operation to execute detection of the time interval ME6i at which the crank angle signal T24 is generated, and the starting of the turn-on and turn-off counters 17, 18, etc.

$\theta$IG-DUTY processing, on the other hand, involves computing such data as an advance angle control value $\theta$IG, a conduction control value DUTY (the ratio of coil conduction time to the TDC signal generation time interval), conduction timing TDUT and ignition timing TIG.

Let us describe the processing for each item of the above data in detail. The second CPU 2 calculates the advance angle control value $\theta IG$ from such values as engine rpm Ne, intake pipe absolute pressure PBA and engine coolant temperature TW in accordance with the following equation (1):

$$\theta IG = \theta MAP + \theta IGCR \ldots \quad (1)$$

In Equation (1), $\theta MAP$ represents a basic advance angle value read out of a map, which is stored in the ROM 11, from a location decided by the engine rpm Ne and intake pipe absolute pressure PBA. $\theta IGCR$ represents the value of a variable for correcting the basic advance angle value. $\theta IGCR$ is read out of a table stored in the ROM 11, from a location decided by the engine coolant temperature TW, intake air temperature TA and atmospheric pressure PB.

Engine rpm Ne used in calculating the value of $\theta MAP$ is provided by the Me counter 24. The value Me employs a sum Me ($=ME60+ME61+ME62+ME63+ME64+ME65$) of values ME60-ME65 obtained by measuring the time intervals of respective stages 0-5 of the crank angle signal T24 shown in (c) of FIG. 3 and (a) of FIG. 4 using clock pulses (fixed clock pulses) CK having a constant period.

The conduction control value DUTY is a function of engine rpm Ne and is read out of a table stored in the ROM 11. The value read out of the table is corrected by the battery voltage before being applied for use as the value DUTY.

Ignition is effected in a range of from 0° to 60° BTDC, namely in stage 4 or 5. More specifically, when the data applied to the turn-off counter 18 is counted down to zero by this counter which starts the countdown operation from the leading edge of stage 4, the current being fed into the primary coil of ignition circuit 21 is cut off. Assume that the input value applied to the turn-off counter 18 is TIG. This is a value obtained by an angle-to-time conversion and is found from the advance angle control value $\theta IG$ and Me value obtained as described above. In addition, the conduction start timing TDUT is a value similarly obtained by an angle-to-time conversion and is decided by the advance angle control value $\theta IG$, conduction control value DUTY and the value Me. Thus, the values TIG and TDUT can each be set to any position within a stage. When an instant at which a particular stage starts (stage 2 in FIG. 4) in which conduction of the ignition coil is to start, the turn-on counter 17 starts counting down from a value corresponding to the value TDUT. Then, when the counted value in the counter 17 becomes 0, i.e. the set conduction starting time is reached, the flip-flop 19 is set to start conduction of the primary winding in the ignition circuit 21. As mentioned above, when the ignition timing TIG is attained in stage 4, the flip-flop 19 is reset by the output of the turn-off counter 18.

By being reset thus, the flip-flop circuit 19 provides the ignition circuit 21 with a signal for terminating conduction of the primary winding. At the instant the flow of current through the primary winding is thus halted, the secondary coil generates the high voltage for ignition to fire the spark plug 22 at the regulated advance angle position.

The first CPU 1 executes an FI (fuel injection) processing program for controlling fuel injection quantity. The first CPU 1 begins executing FI processing upon receiving the aforementioned trigger signal q outputted by the second CPU 2 at stage 3, namely when a crank angle position 90° BTDC is sensed by the crank angle sensor 16, in the crank interrupt processing process performed by the second CPU 2.

According to FI processing, the first CPU 1 reads in such data as the intake pipe absolute pressure PBA from the PBA transducer 5, the throttle valve opening signal $\theta TH$ and the detected value of $O_2$ concentration in the exhaust gases, reads in data indicative of Me counted by the Me counter 29, calculates fuel injection time TOUT in accordance with the following equation (2):

$$TOUT = Ti \times K1 + K2 \ldots \quad (2)$$

and, at the same time that the calculation of TOUT ends, controls the start of the counter circuit 7, namely the counter for the predetermined engine cylinder into which fuel injection is to be effected.

In the above equation (2) for TOUT, Ti represents a basic fuel injection time during which the fuel injection valve 8 injects fuel. Ti is read out of the ROM 3 on the basis of, e.g., the intake pipe absolute pressure PBA and engine rpm Ne. K1 and K2 are correction coefficients and correction variables, respectively, calculated in dependence upon engine operating parameter signals from various parameter sensors such as the aforementioned sensors. K1 and K2 are calculated on the basis of predetermined arithmetic expressions in such a manner that such characteristics as the engine starting characteristic, emission characteristics, fuel consumption and engine acceleration characteristic are optimized in dependence upon the engine operating state. As described above, upon termination of calculation of the fuel injection period TOUT, the first CPU 1 sets a counter within the counter circuit 7 corresponding to the predetermined cylinder into which fuel is to be injected to the value corresponding to the calculated fuel injection period TOUT, and starts the set counter. The counter counts down from the set value and supplies the corresponding fuel injection valve 8 with a driving signal during the period of time the counter counts down from the initial value to 0, to thereby control the quantity of fuel to be supplied to the engine.

Figure 5:
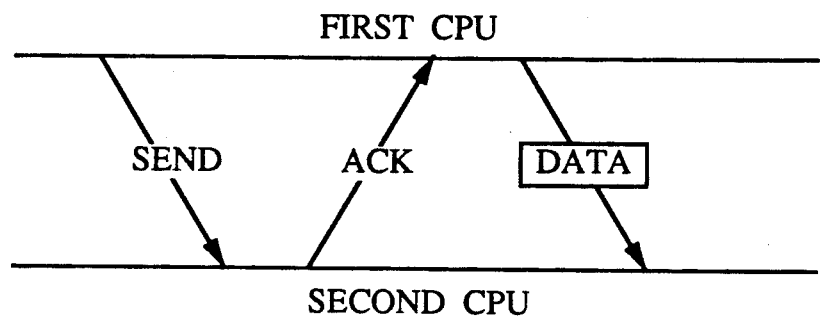
FIG. 5 is a timing chart illustrating the timing of transfer of one frame of data from the first central processing unit to the second central processing unit.
Figure 6:
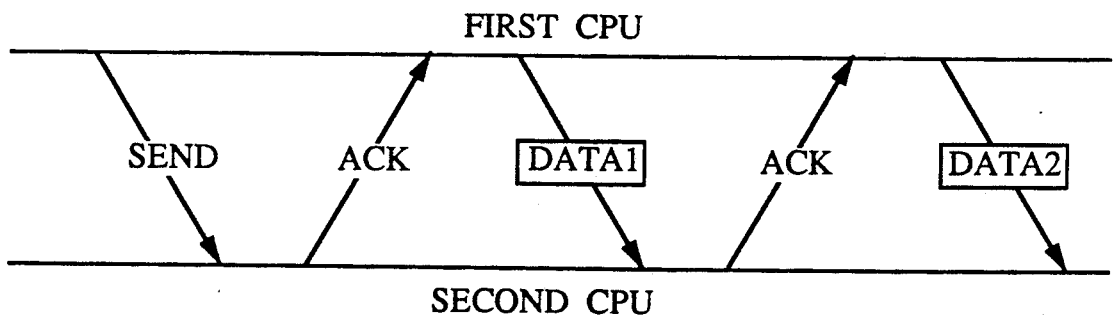
FIG. 6 is a timing chart illustrating the timing of transfer of two frames of data from the first central processing unit to the second central processing unit.

Next, the manner of transfer of such data as engine operating parameters via the transfer lines 27, 28 for data transfer will be described. The data transfer is effected in serial asynchronous manner when the first and second CPU's 1, 2 are free from such operations as crank interrupt processing operation and $\theta IG$-Duty calculation executed by the second CPU 2 and FI calculation executed by the first CPU 1 (this state is called "background"). First, when the first CPU 1 is in a background state wherein the FI calculation is not effected, the CPU 1 sends a transfer instruction signal SEND to the second CPU 2 via the transfer line 28 as shown in FIG. 5. When the second CPU 2 is in a background state wherein operations such as crank interrupt processing operation are not effected, that is, when the second CPU 2 is ready to receive data, it responds to the transfer instruction signal SEND from the first CPU 1 by sending an acknowledgement signal ACK which indicates that the CPU 2 is ready to receive data from the CPU 1 via the transfer line 27. Responsive to the signal ACK, the first CPU 1 activates the shift register 33 with a clock pulse to output a start bit. Then, the shift register 33 outputs, one bit by one bit, data DATA, indicative of engine operating parameters, which have been parallelly loaded into the register from the latch circuit 32, each time a clock pulse is applied to the register, to thereby transfer the data DATA to the second CPU 2 via the transfer line 28. The shift register 39 in the second CPU 2 is loaded in serial manner with each bit of the transferred data DATA each time a clock pulse is applied to the register 39 through the line 40. At the time of a stop bit subsequent to the data DATA being inputted to the register 39, the latch circuit 38 is activated, into which 8 bits of the data DATA are latched at one time from the shift register 39. The data DATA latched into the latch circuit 38 is written into the RAM 12 by the second CPU 2 in its writing operation. The second CPU 2 is also adapted to send a request instruction signal to the first CPU 1 for requesting the first CPU 1 to transfer data thereto. In the same manner as stated above, the latest values of engine operating parameters are read into the RAM 12 connected with the second CPU 2 as well as the RAM 4 connected with the first CPU 1. When two frames of data are to be continuously transferred from the first CPU 1 to the second CPU 2, the second CPU 2, after receiving a first frame of data DATA1, sends the acknowledgement signal ACK to the first CPU 1, and then receives a subsequent frame of data DATA2. When an interrupt instruction enters one of the CPU's during the data transfer operation, no clock pulse is inputted to the corresponding shift register 33 or 39, to thereby halt the data transfer and effect the interrupt operation with priority to the data transfer. After the interrupt operation has been completed, the data transfer is resumed.

The fuel supply control applicable to the system according to the invention may include control for either the fuel injection quantity or the injection timing. Also, the ignition control applicable to the system of the invention may include control for either ignition timing or the conduction period.

What is claimed is:

1. A method of transferring at least one signal between a first central processing unit provided in an electronic control system for controlling fuel supply to an internal combustion engine and a second central processing unit provided in said electronic control system for controlling ignition of a mixture supplied to said engine, wherein a value of at least one operating parameter of said engine is detected, and the detected value of said at least one operating parameter is used both for controlling the fuel supply to said engine and for controlling the ignition of the mixture supplied to said engine, the method comprising the steps of:

connecting at least one signal transfer line between said first and second central processing units;

causing said first central processing unit to produce a digital signal representing the detected value of said at least one operating parameter;

causing said first central processing unit to produce data consisting of a predetermined number of bits as said digital signal;

causing said first central processing unit to send a transfer instruction signal to said second central processing unit when said first central processing unit is in a background state wherein a calculation of fuel supply amount is not being carried out;

causing said second central processing unit to send an acknowledgement signal to said first central processing unit to initiate a transfer of said data to said second central processing unit when said second central processing unit is in a background state wherein a calculation of ignition timing is not being carried out;

causing said first central processing unit to start in response to said acknowledgment signal to transform said data by serializer means into a sequence of pulses, each pulse corresponding to a respective one of said bits, and to transfer said pulses one by one to said second central processing unit through said signal transfer line in a start-stop serial manner, said serializer means being operated in synchronism with a first clock signal; and causing said second processing unit to transform said sequence of pulses transferred to said second processing unit back into data consisting of said predetermined number of bits by deserializer means, said deserializer means being operated in synchronism with a second clock signal which is asynchronous with said first clock signal but has the same pulse repetition period as said first clock signal, said second central processing unit being able to send a request instruction signal to said first central processing unit for requesting said first central processing unit to transfer data thereto.

2. A method as claimed in claim 1, wherein said at least one operating parameter of said engine is the rotational speed of said engine.

* * * * *